J. A. H. ELLIS.
Improvement in Steam and Gas Engines.
No. 4,806. Reissued March 12, 1872.
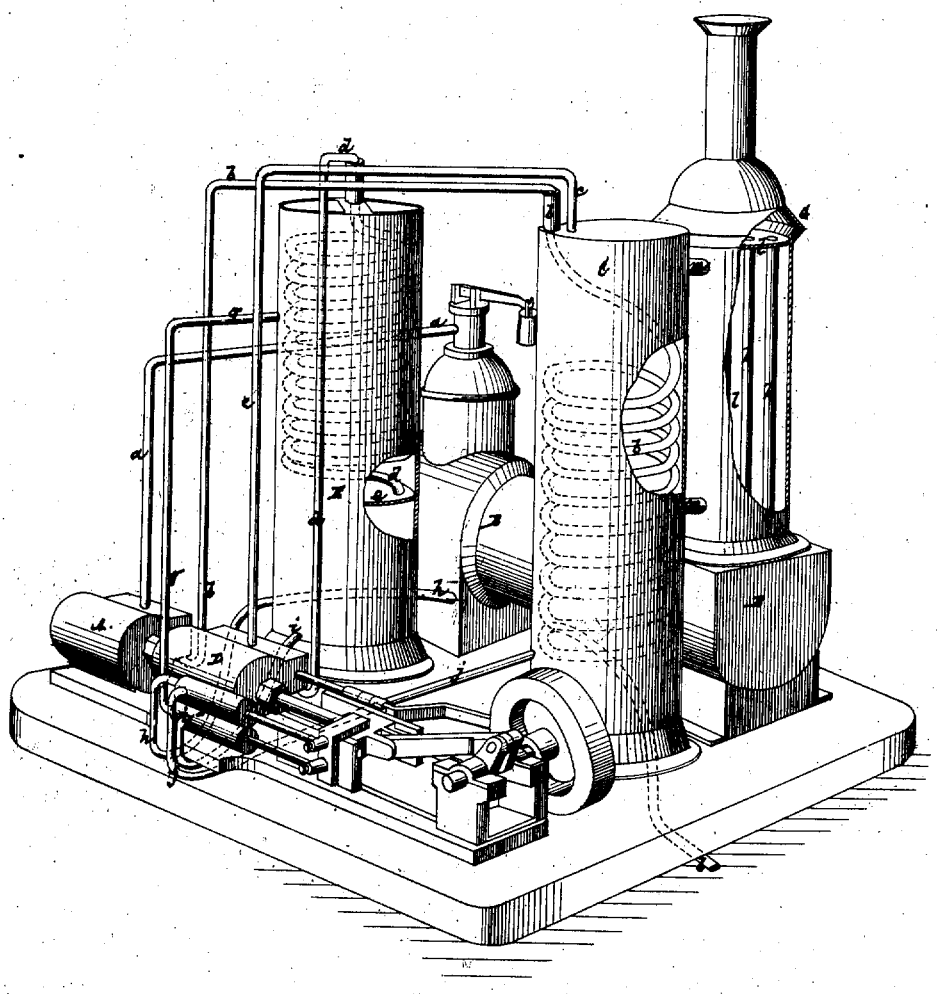
Witnesses:
Fred. Haynes
R. R. Rabin
Joel A. H. Ellis
per Rom Lombard & Co
Attorneys

UNITED STATES PATENT OFFICE.

JOEL A. H. ELLIS, OF SPRINGFIELD, VERMONT.

IMPROVEMENT IN STEAM AND GAS ENGINES.

Specification forming part of Letters Patent No. 108,574, dated October 25, 1870; reissue No. 4,806, dated March 12, 1872.

Specification describing certain Improvements in Combined Steam and Gas Engines, invented by JOEL A. H. ELLIS, of Springfield, in the county of Windsor and State of Vermont.

This invention has mainly for its object the utilization of the heat contained in the exhaust steam of engines, and relates to combined steam and gas or vapor engines in which the exhaust steam, as it escapes from the one engine, is employed to vaporize gasoline or other hydrocarbon or volatile liquid, the vapor of which is used to operate another engine, or otherwise employed to produce motive power. The invention consists in a novel process of utilizing the exhaust steam of high-pressure or non-condensing engines by causing said steam in the course of its escape to the atmosphere, as distinguished from its condensation within a close condenser for the production of a vacuum, to circulate within a tank or vessel containing the hydrocarbon or volatile liquid to be evaporated, and, finally, to pass off by a discharge-orifice open to the atmosphere or to a receptacle in free communication therewith. By thus using the exhaust steam, although the engine from which it escapes works as against the pressure of the atmosphere, I am enabled to use a less volatile and dangerous liquid, and for working the additional engine or motor, than when condensing the exhaust steam within the tank or vessel containing said liquid to produce a vacuum for the purpose of aiding the primary engine; and am furthermore enabled to use steam of a higher pressure, and to keep the vaporizer of the volatile liquid at a higher temperature, thereby adding to the power of the gas or vapor engine; likewise, all choking by failure to condense the escaping steam, and much complication are avoided. The invention also consists in a novel connection or combination of the exhaust-pipe of the steam-engine, with the vaporizer of the hydrocarbon or volatile liquid, whereby the latent heat of the steam is gradually, instead of instantaneously, absorbed, and the highest temperature of the exhaust steam employed in heating the vapor within the vaporizer, and said steam afterward gradually cooled in its passage down through the liquid to the atmosphere, thereby producing a superheating of the vapor, and economical employment of the heat in the steam as it passes through the vaporizer used to operate the secondary engine or motor. The invention also consists in a novel and advantageous construction of condenser for the vapor of the volatile liquid in combined steam and vapor engines, likewise in means whereby the escaping products of combustion from the boiler are employed to heat the vaporizer of the hydrocarbon or volatile liquid.

The accompanying drawing represents a view in perspective of an apparatus, or such portions of one as are necessary to a full understanding of my invention, and which will serve as well as any other to illustrate the novel principles of action and means employed. In such apparatus the gas or vapor engine is shown as mechanically connected with the steam-engine, forming part of the combination, but it may be separated therefrom.

A is the steam-engine of any suitable construction, and connected by a steam-pipe, *a*, with a boiler, B, of any suitable kind. C is the vaporizer or tank containing the volatile liquid, which may be gasoline or other hydrocarbon. The exhaust-pipe *b* of the steam-engine A connects with said tank at its upper or vapor-holding portion, which is made to form a superheating-chamber or space by the extension of the exhaust-pipe therein or through prior to its entry, which may be by a worm or coil, down within the lower or liquid-holding portion of the tank, through the bottom of which latter said pipe passes, and is open to the atmosphere or otherwise equivalently exposed. The heat of the exhaust steam thus passing through the tank not merely converts the liquid contained in the latter into vapor, but, by reason of the hottest circulation being in the upper portion of the tank, superheats the vapor, and the heat of the steam is gradually absorbed as the steam passes down through the tank, thereby producing a rapid evaporation from the surface of the liquid and perfect cooling of the steam before its final escape from the tank. This utilizes the heat of the steam in a most efficient and economical manner. The vapor thus generated within said tank is carried by a pipe, *c*, to an engine, D, of any suitable construction, and by its expansive force operates said engine, which exhausts by a pipe, *d*, into a condenser, E. This condenser is filled with water above a false bottom, *e*, and receives the coiled pipe *d*, as shown. The vapors in the pipe *d* will give off their heat to the water and become condensed, the condensed liquid passing into the lower part *f* of the condenser, from whence it is returned to the tank C. The water in the condenser may be used for the feed-water of the boiler, and is, therefore, advantageously heated by the exhaust vapors from the engine D. F is a feed-pump, connected by a pipe, *g*, with the water-chamber of the condenser for forcing the water through a pipe, *h*, into the boiler. The same or another pump is connected by a pipe, *i*, with the lower compartment *f* of the condenser, and by a pipe, *j*, with the tank C, for forcing the condensed liquid from the condenser into the tank. The smoke-stack G of the boiler *b* may also be converted into a tank for vaporizing the volatile liquid. For this purpose, the smoke-flues *k k* may be made to pass through a vessel, *l*, which is connected by pipes *m m* with the tank C, so that the heat of the products of combustion passing through the flues *k k* may be utilized for vaporizing the liquid in the vessel *l* and tank.

The connection or combination of the tank and smoke-stack is not necessary, but desirable. Either may be used independently of or without the other.

What is here claimed, and desired to be secured by Letters Patent, is—

1. The process, substantially as herein described, of accumulating motive power by absorbing the latent heat in the exhaust steam from one engine, in vaporizing a volatile liquid, when said steam is exhausted to the atmosphere after circulating through the vaporizer containing the volatile liquid, the vapor of which is to be employed to actuate another engine, as herein set forth.

2. The combination of the tank or vaporizer C with the steam-engine A and exhaust steam-pipe *b*, when said pipe is arranged to connect with said tank at or near its top, and is extended down through the tank, substantially as and for the purposes herein set forth.

3. A condenser, E, for steam and vapor engines, divided by a false bottom, *e*, into a water-chamber above and a hydrocarbon-chamber below, in combination with the vapor-pipe *d*, as and for the purpose described.

4. The boiler B having a smoke-stack, G, provided with a hydrocarbon-chamber, *l*, and flues *k*, as and for the purpose described.

JOEL A. H. ELLIS.

Witnesses:

J. AUSTIN PARKS,

J. HENRY TAYLOR.